United States Patent
Tsuiki et al.

(10) Patent No.: US 10,136,773 B2
(45) Date of Patent: Nov. 27, 2018

(54) TOILET DEVICE

(71) Applicant: TOTO LTD., Kitakyushu-shi, Fukuoka (JP)

(72) Inventors: Shoichi Tsuiki, Kitakyushu (JP); Yuta Tanogashira, Kitakyushu (JP); Masami Tsujita, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 43 days.

(21) Appl. No.: 15/281,552

(22) Filed: Sep. 30, 2016

(65) Prior Publication Data

US 2017/0095125 A1  Apr. 6, 2017

(30) Foreign Application Priority Data

Oct. 1, 2015  (JP) .................. 2015-196138

(51) Int. Cl.
| | |
|---|---|
| *A47K 13/10* | (2006.01) |
| *G01S 13/36* | (2006.01) |
| *G01S 13/56* | (2006.01) |
| *A47K 13/30* | (2006.01) |
| *E03D 9/08* | (2006.01) |
| *E03C 1/05* | (2006.01) |
| *G01S 7/41* | (2006.01) |

(52) U.S. Cl.
CPC .............. *A47K 13/10* (2013.01); *G01S 13/36* (2013.01); *G01S 13/56* (2013.01); *A47K 13/305* (2013.01); *E03C 1/057* (2013.01); *E03D 9/08* (2013.01); *G01S 7/411* (2013.01)

(58) Field of Classification Search
CPC .......... A47K 13/10; G01S 13/36; G01S 13/56
USPC ............................................. 4/234
See application file for complete search history.

(56) References Cited

U.S. PATENT DOCUMENTS

| | | | |
|---|---|---|---|
| 2003/0154541 A1* | 8/2003 | Miller | A47K 13/10 4/246.1 |
| 2017/0016221 A1* | 1/2017 | Yamamoto | G01S 13/56 |

* cited by examiner

*Primary Examiner* — Tuan N Nguyen
(74) *Attorney, Agent, or Firm* — Pearne & Gordon LLP

(57) ABSTRACT

A toilet device includes a toilet seat device, a radio wave sensor, and a controller. The toilet seat device is provided on a toilet bowl. The controller is configured to operate the toilet seat device based on a signal outputted from the radio wave sensor. The radio wave sensor is being operable for detecting presence of a human body in a first area including front of the toilet seat device, detecting motion of a human body in a second area including the front of the toilet seat device and a region outside the first area, and determining sensing of the human body based on detection result of the motion of the human body and detection result of the presence of the human body.

5 Claims, 12 Drawing Sheets

TOILET DEVICE

CROSS-REFERENCE TO RELATED APPLICATIONS

This application is based upon and claims the benefit of priority from Japanese Patent Application No. 2015-196138, filed on Oct. 1, 2015; the entire contents of which are incorporated herein by reference.

FIELD

Embodiments of the invention relate to a toilet device.

BACKGROUND

A system for sensing control in a toilet space is disclosed in Japanese Unexamined Patent Publication 2005-81032. In this system, a technique for sensing the motion of a to-be-sensed object by detecting the phase difference or number of waves using microwaves is combined with a technique for sensing the presence of the to-be-sensed object. The sensing range of such a human body sensing means is set so as to be able to sense a human body in a prescribed distance from the toilet.

However, the sensing range of the human body sensing means depends on the environment in which the human body sensing means is provided, such as temperature, and the size and shape of the toilet room. For instance, if the human body sensing means is concealed inside the toilet device, the attenuation amount of radio waves is changed by the state of the toilet device such as opening/closing of the toilet seat or toilet lid, and by the outer frame of equipment. This increases the variation of the sensing range. The sensing range may be set wider in view of the variation. However, this may result in also sensing a person having no intention of use (such as a person only passing in front of the toilet room).

SUMMARY

According to one embodiment, a toilet device includes a toilet seat device, a radio wave sensor, and a controller. The toilet seat device is provided on a toilet bowl. The controller is configured to operate the toilet seat device based on a signal outputted from the radio wave sensor. The radio wave sensor is being operable for detecting presence of a human body in a first area including front of the toilet seat device, detecting motion of a human body in a second area including the front of the toilet seat device and a region outside the first area, and determining sensing of the human body based on detection result of the motion of the human body and detection result of the presence of the human body.

DETAILED DESCRIPTION

Figure 1:
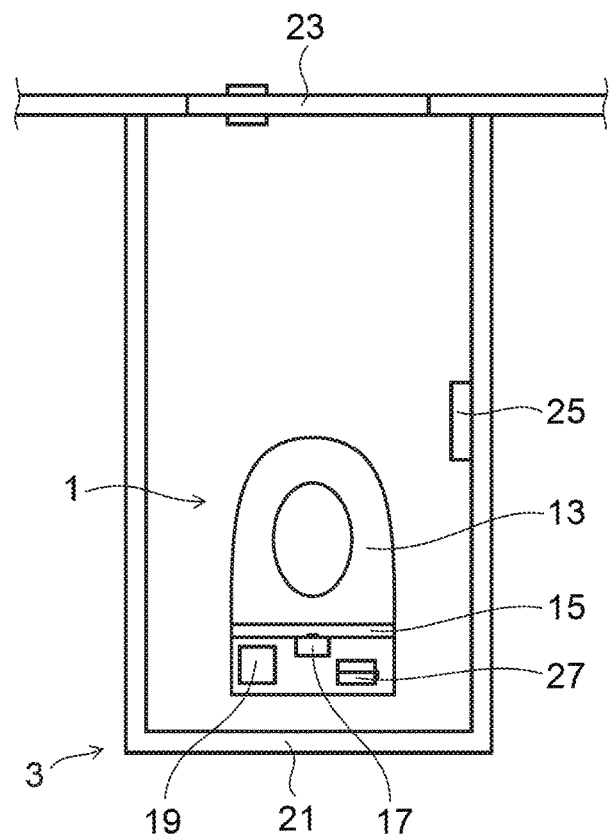
FIG. 1 is a plan view showing a toilet room installed with a toilet device according to an embodiment of the invention.

A first aspect of the invention is a toilet device comprising a toilet seat device provided on a toilet bowl, a radio wave sensor, and a controller configured to control operation of the toilet seat device based on a signal outputted from the radio wave sensor. The radio wave sensor detects presence of a human body in a first sensing area including front of the toilet seat device. The radio wave sensor detects motion of a human body in a second sensing area including the front of the toilet seat device and a region outside the first sensing area. The radio wave sensor determines sensing of the human body based on detection result of the motion of the human body and detection result of the presence of the human body.

This toilet device detects the motion of a human body in the second sensing area, and detects the presence of a human body in the first sensing area. Thus, a human body having the intention of using the toilet device can be sensed with higher accuracy.

A second aspect of the invention is a toilet device according to the first aspect of the invention, wherein the radio wave sensor further detects the human body's approaching or leaving the toilet seat device in the second sensing area. The radio wave sensor determines sensing of the human body based on detection result of the human body's approaching or leaving the toilet seat device, the detection result of the motion of the human body, and the detection result of the presence of the human body.

This toilet device can reduce the possibility of erroneously sensing a human body leaving the toilet device.

A third aspect of the invention is a toilet device according to the first aspect of the invention, wherein the toilet seat device includes a toilet lid. The controller performs control for opening the toilet lid when the radio wave sensor has determined that the human body has been sensed.

In this toilet device, a person having the intention of using the toilet device can be sensed with higher accuracy. The controller can open the toilet lid based on the sensing result. This can reduce the possibility of opening the toilet lid for a person having no intention of using the toilet device, and reduce the power consumption of the toilet device.

A fourth aspect of the invention is a toilet device according to the first aspect of the invention, wherein the radio wave sensor modifies condition of the detection in the first sensing area so that a human body is more likely to be detected, when the toilet device has been used though it has not been determined that the human body has been sensed.

The first sensing area may vary when the intensity of radio waves emitted from the radio wave sensor decreases, or when the intensity of radio waves reflected from the human body decreases. Even in such cases, this toilet device can suppress the decrease of the accuracy of human body sensing.

A fifth aspect of the invention is a toilet device according to the first aspect of the invention, wherein the radio wave sensor determines sensing of the human body based on the detection result in the second sensing area irrespective of the detection result in the first sensing area, when the toilet device has been used though it has not been determined that the human body has been sensed.

The first sensing area may vary when the intensity of radio waves emitted from the radio wave sensor decreases, or when the intensity of radio waves reflected from the human body decreases. Even in such cases, this toilet device can suppress the decrease of the accuracy of human body sensing.

Embodiments of the invention will now be described with reference to the drawings. In the drawings, similar components are labeled with like reference numerals, and the detailed description thereof is omitted appropriately.

FIG. 1 is a plan view showing a toilet room installed with a toilet device according to an embodiment of the invention.

Figure 2:
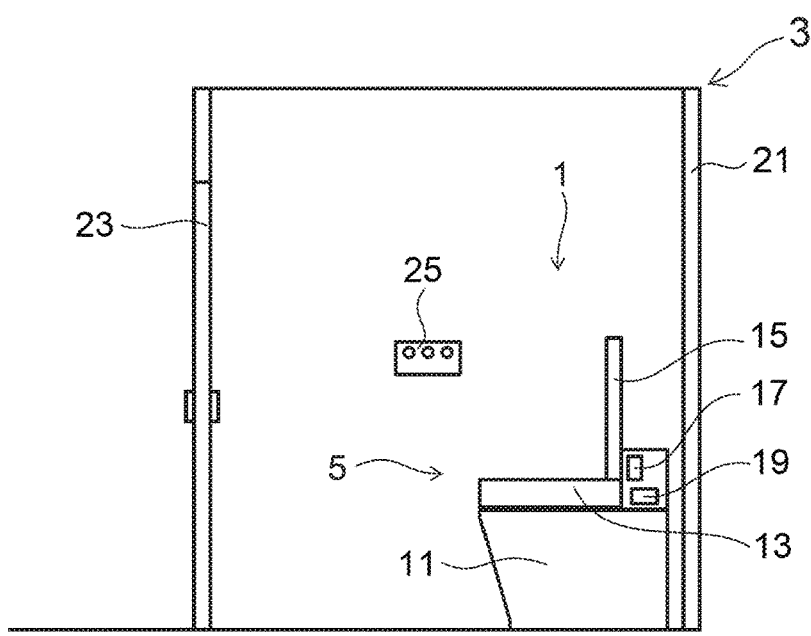
FIG. 2 is a side view showing the toilet room installed with the toilet device according to the embodiment of the invention.

FIG. 2 is a side view showing the toilet room installed with the toilet device according to the embodiment of the invention.

As shown in FIGS. 1 and 2, the toilet device 1 is installed in a toilet room 3. The toilet room 3 is a space enclosed with a wall 21 and a door 23. A user of the toilet device 1, for instance, opens the door 23 and enters the toilet room 3. Then, the user closes the door 23 and uses the toilet device 1. Alternatively, the door 23 is in the opened state when the toilet room 3 is not in use. The user closes the door 23 after entering the toilet room 3, and uses the toilet device 1.

In this embodiment, the toilet device 1 includes a toilet seat device 5 and a toilet bowl 11. The toilet seat device 5 includes a toilet seat 13, a toilet lid 15, a radio wave sensor 17, a controller 19, and a seating sensor 27. A remote controller 25 may be provided on the sidewall of the toilet room 3. The toilet seat device 5 can be controlled by this remote controller. The toilet device of this embodiment does not necessarily need to include the toilet bowl 11. As described later in detail, the toilet seat device 5 and the radio wave sensor 17 may be provided separately.

The toilet seat 13 may include a heater. Besides, the toilet seat device 5 may include e.g. a private part cleaning device for cleaning the "bottom" of the user seated on the toilet seat 13.

The toilet lid 15 is provided so as to cover the toilet seat 13. The rotary shaft of the toilet lid 15 is provided on the rear side of the toilet seat 13. The toilet lid 15 is made rotatable about this rotary shaft.

The radio wave sensor 17 emits radio waves toward a prescribed sensing region and senses an object such as a human body entering the sensing region. The radio wave sensor 17 can sense the motion (velocity) of the object using the Doppler effect. The radio wave sensor 17 is e.g. a microwave sensor using the wavelength band of microwaves. Alternatively, the radio wave sensor 17 may be a millimeter wave sensor using radio waves in the millimeter wave band. Radio waves pass through a material having relatively low relative dielectric constant such as wood, resin, and ceramic. Thus, the radio wave sensor 17 can detect e.g. the moving state of a human body outside the toilet room 3.

The radio wave sensor 17 is provided inside e.g. the toilet seat device 5. Alternatively, the radio wave sensor 17 may be attached to the remote controller 25. Alternatively, the radio wave sensor 17 may be provided on e.g. the toilet bowl 11 or the inner wall, ceiling, or floor of the toilet room 3 separately from the toilet seat device 5.

The seating sensor 27 is e.g. a reflective infrared sensor. The seating sensor 27 can sense that a user is seated on the toilet seat 13 by emitting infrared radiation and detecting the infrared radiation reflected by a human body. The seating sensor 27 only needs to be able to sense that a user is seated on the toilet seat 13. Besides the reflective infrared sensor, the seating sensor 27 may be based on e.g. a radio wave sensor or mechanical switch.

The controller 19 controls e.g. the opening/closing operation of the toilet seat 13 and the toilet lid 15, and the energization of the heater of the toilet seat 13. The controller 19 controls e.g. the operation and energization of each part of the toilet seat device 5 based on the output from the radio wave sensor 17 and the seating sensor 27.

Next, radio waves emitted from the radio wave sensor 17 are described.

Figure 3:
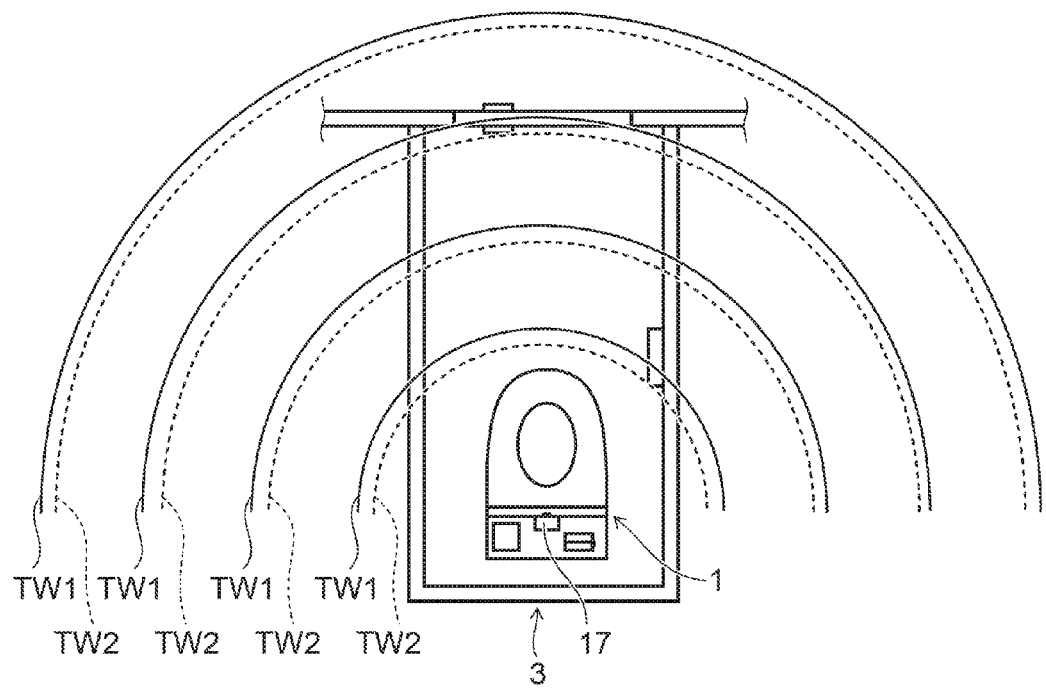
FIG. 3 is a plan view schematically showing the wave fronts of radio waves emitted from the radio wave sensor of the toilet seat device according to the embodiment of the invention.

FIG. 3 is a plan view schematically showing the wave fronts of radio waves emitted from the radio wave sensor 17 of the toilet seat device 5 according to the embodiment of the invention.

Radio waves emitted from the radio wave sensor 17 spread e.g. concentrically about the radio wave sensor 17. The intensity of radio waves emitted forward from the toilet seat device 5 may be higher than the intensity of radio waves emitted toward the other directions. In this embodiment, for instance, as shown in FIG. 3, a first transmission wave TW1 and a second transmission wave TW2 are emitted from the radio wave sensor 17. The first transmission wave TW1 and the second transmission wave TW2 are out of phase with each other by e.g. $\lambda/4$. Alternatively, the phases of two signals can be shifted from each other by e.g. the following method. Inside the radio wave sensor 17, two reception signals are generated from one reception wave. The phase of one signal can be shifted from the phase of the other signal.

Figure 4:
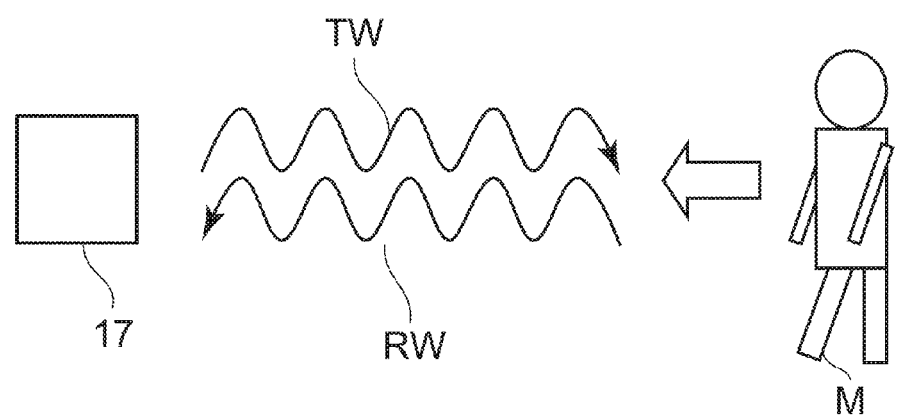
FIG. 4 is a conceptual view showing the reflection of radio waves by a to-be-sensed body.

FIG. 4 is a conceptual view showing the reflection of radio waves by a to-be-sensed body.

When the transmission wave TW of the radio waves emitted from the radio wave sensor 17 is reflected by a to-be-sensed body such as a human body M, a reflection wave RW is formed. The radio wave sensor 17 can detect the reflection wave RW. The radio wave sensor 17 is configured so as to be able to detect the standing wave signal and the Doppler signal formed from the transmission wave TW and the reflection wave RW.

Next, a specific configuration and operation of the radio wave sensor 17 is described with reference to FIG. 5.

Figure 5:
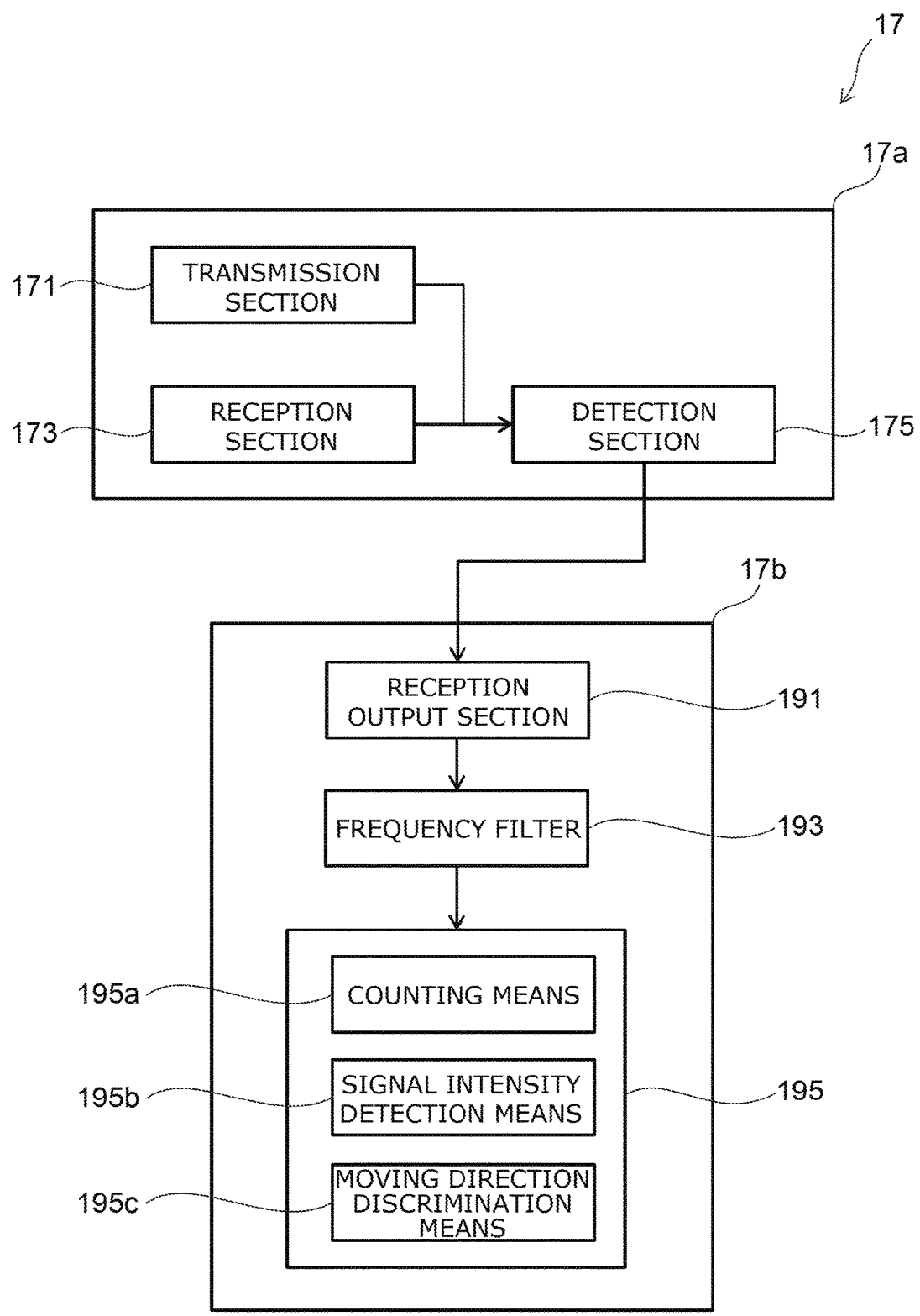
FIG. 5 is a block diagram showing the configuration of the radio wave sensor.

FIG. 5 is a block diagram showing the configuration of the radio wave sensor 17.

The radio wave sensor 17 includes a transceiver section 17a and a determination section 17b. The transceiver section 17a includes a transmission section 171, a reception section 173, and a detection section 175. The transmission section 171 includes an oscillation circuit and an antenna for emitting radio waves forward from the toilet seat device 5. The oscillation circuit generates a transmission signal, which is an electrical signal of e.g. 10.5 GHz or 24.1 GHz. The antenna emits the transmission signal outputted from the oscillation circuit as radio waves of e.g. 10.5 GHz or 24.1 GHz.

The radio waves emitted from the transmission section 171 are reflected as a reflection wave by a to-be-sensed body such as a human body M. The reception section 173 receives the reflection wave and converts it to an electrical signal for output as a reception signal. The detection section 175 mixes the transmission signal and the reception signal. This mixed signal contains a standing wave signal and a Doppler signal. The signal detected in the transceiver section 17a is outputted to the determination section 17b. In the determination section 17b, this signal is converted to a digital signal by a reception output section 191, which is an A/D conversion means. The digitized signal is processed by a frequency filter 193 to filter out frequency components other than e.g. the band necessary for human body sensing, and inputted to a computation section 195.

The frequency filter 193 may be provided between the detection section 175 and the reception output section 191. In this case, the signal processed by the frequency filter 193 is subjected to the processing of conversion to a digital signal.

The computation section 195 includes e.g. a counting means 195a, a signal intensity detection means 195b, and a moving direction discrimination means 195c.

The counting means 195a counts e.g. the number of waves contained in the signal to detect the motion of the to-be-sensed object.

The signal intensity detection means 195b detects the intensity of the signal (amplitude of the signal) to detect the presence of the to-be-sensed object. The signal intensity detection means 195b does not necessarily need to detect both the "presence" and "absence". For instance, the signal intensity detection means 195b may detect only "presence". Based on the result of this detection, the signal intensity detection means 195b can determine the "absence" when the "presence" is not detected.

A first signal is formed from the first transmission wave TW1 and its reflection wave. A second signal is formed from the second transmission wave TW2 and its reflection wave. The moving direction discrimination means 195c detects the difference between the phases of these signals to detect the moving direction of the to-be-detected object.

The computation section 195 determines the sensing of a human body based on the results outputted from the counting means 195a, the signal intensity detection means 195b, and the moving direction discrimination means 195c.

The computation section 195 may include only the counting means 195a and the signal intensity detection means 195b without including the moving direction discrimination means 195c. In this case, the computation section 195 determines the sensing of a human body based on the results outputted from the counting means 195a and the signal intensity detection means 195b.

When the determination section 17b has determined that a human body has been sensed, the controller 19 can cause the toilet device 1 to e.g. open the toilet lid 15 or heat the toilet seat 13 in response to the determination result.

FIGS. 1 and 5 illustrate the case where the determination section 17b and the controller 19 are separate. However, this embodiment is not limited thereto. For instance, the controller may be configured to have also the function of the determination section 17b. In this case, the controller 19 also functions as part of the radio wave sensor 17.

In any case, the determination section 17b may be implemented as an electronic circuit for performing prescribed signal processing and computation. Alternatively, at least part of its function may be implemented by a microcomputer (CPU).

Next, an example of human body sensing performed by the radio wave sensor 17 is described with reference to FIG. 6.

Figure 6:
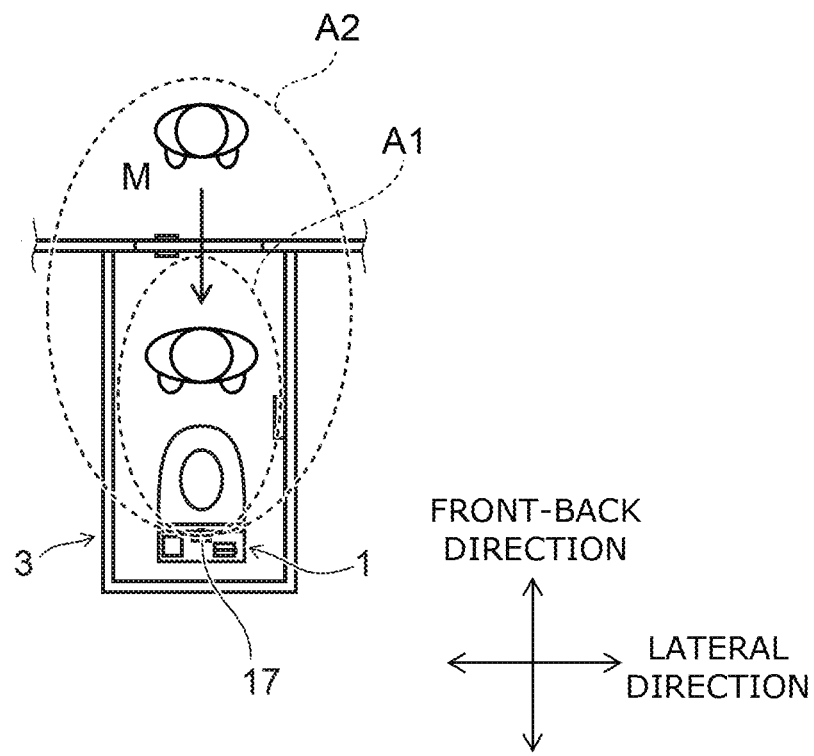
FIG. 6 is a plan view showing an example of sensing areas and the movement of a human body.

FIG. 6 is a plan view showing an example of sensing areas and the movement of a human body.

As shown in FIG. 6, a first sensing area A1 and a second sensing area A2 are formed in front of the toilet seat device 5 by the radio wave sensor 17. These sensing areas A1 and A2 are regions where the radio wave sensor 17 can sense a to-be-sensed body such as a human body M. That is, the sensing areas A1 and A2 correspond to the range where radio waves are emitted with intensity necessary for the radio wave sensor 17 to sense a to-be-sensed body. Thus, the position and size of the formed sensing areas A1 and A2 can be determined by e.g. the direction and intensity (power) of radio waves emitted from the radio wave sensor 17.

The first sensing area A1 includes the front of the toilet seat device 5. The first sensing area A1 is formed to be as large as possible to the extent that e.g. it is fitted inside the toilet room 3. As an example, the first sensing area A1 has a front-back length of 1600 mm and a lateral length of 800 mm. The front-back direction and the lateral direction are directions as viewed from the user seated on the toilet seat 13 of the toilet device 1.

The second sensing area A2 includes the front of the toilet seat device 5 and a region outside the first sensing area A1. Part of the second sensing area A2 may overlap the first sensing area A1. The second sensing area A2 is set to be e.g. the largest size that can be detected by the radio wave sensor 17. In this case, the second sensing area A2 is formed so as to include e.g. the outside of the toilet room 3. However, for instance, in the case where the toilet room 3 is large, the second sensing area A2 may not include the outside of the toilet room 3.

The radio wave sensor 17 detects the motion of a to-be-sensed object such as a human body M in the second sensing area A2. The radio wave sensor 17 detects the presence of a to-be-sensed object such as a human body M in the first sensing area A1. The radio wave sensor 17 determines sensing of a human body M based on the detection results in the respective areas.

Figure 7:
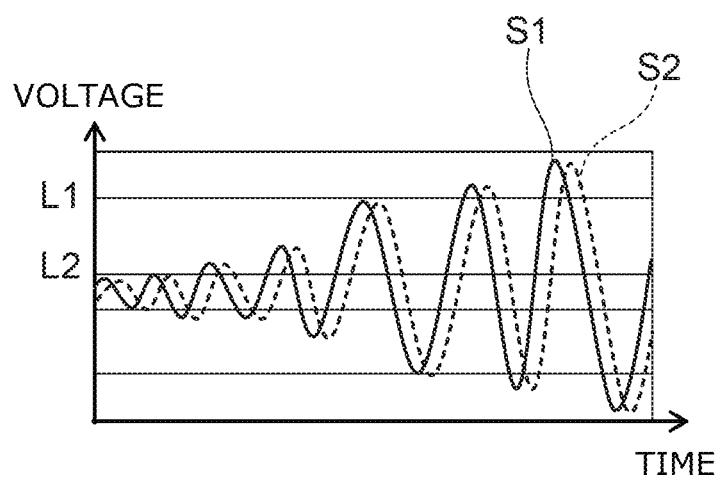
FIG. 7 is a graph showing the signal generated by the detection section or the reception output section in the example shown in FIG. 6.
Figure 8:
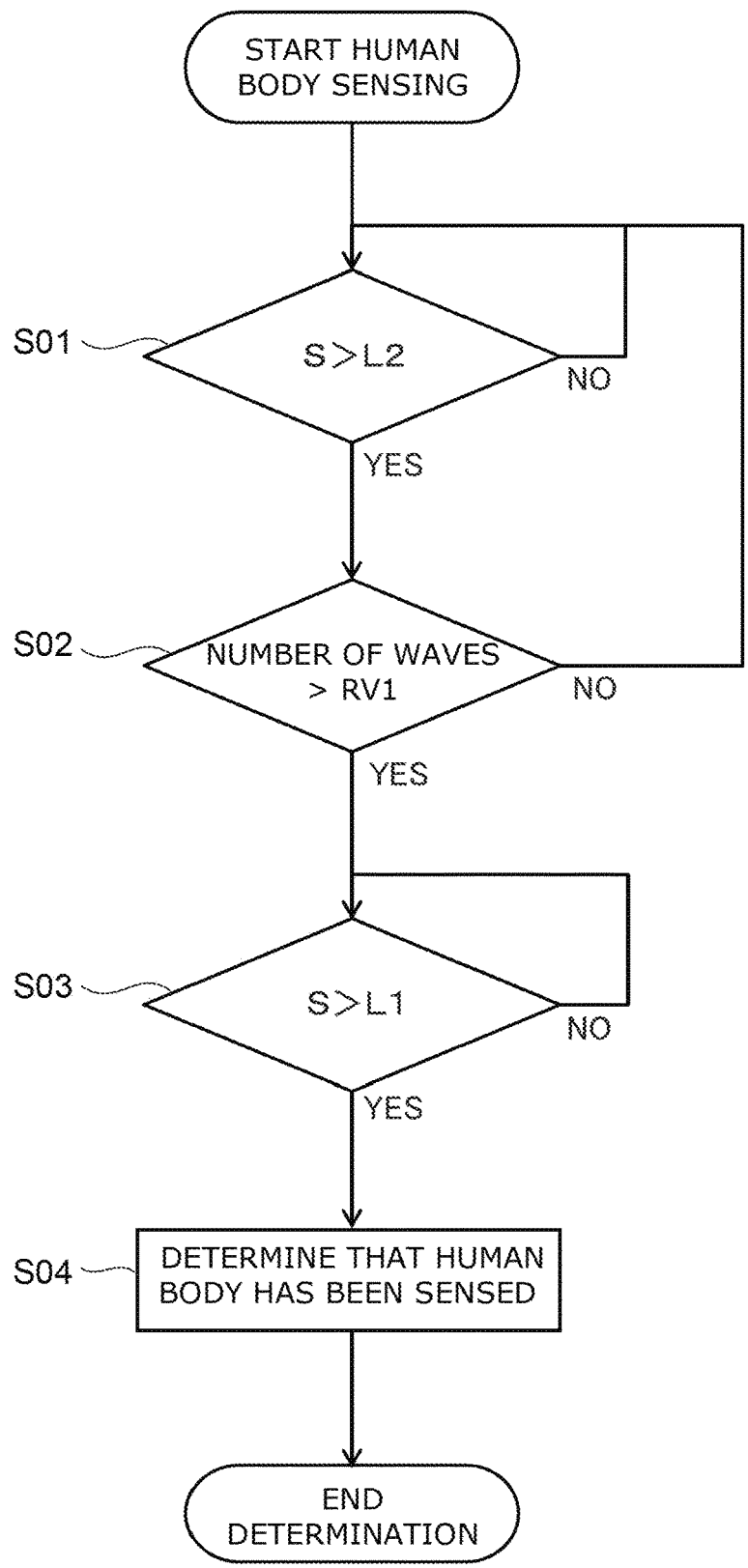
FIG. 8 is a flow chart showing a processing of human body sensing in the toilet device according to the embodiment of the invention.

The processing of human body sensing in this embodiment is described more specifically with reference to FIGS. 7 and 8.

FIG. 7 is a graph showing the signal S generated by the detection section 175 or the reception output section 191 in the example shown in FIG. 6.

FIG. 8 is a flow chart showing a processing of human body sensing in the toilet device 1 according to the embodiment of the invention.

In FIG. 7, the solid line represents a signal S1 based on the first transmission wave TW1 and its reflection wave. The dashed line represents a signal S2 based on the second transmission wave TW2 and its reflection wave. Alternatively, the signals S1 and S2 represent signals generated from one reception wave and made out of phase with each other.

In the following, the signals S1 and S2 may be collectively and simply referred to as signal S.

First, in step S01, the signal intensity detection means 195b compares the intensity (amplitude) of the signal S with a second level L2. The second level L2 may be adapted to either of the signals S1 and S2. When a human body M moves from outside the toilet room 3 toward the door 23, the intensity (amplitude) of the signal S gradually increases. When the signal intensity detection means 195b detects that the intensity of the signal S has exceeded the second level L2 (that the human body M has entered the second sensing area A2), the flow proceeds to step S02.

In step S02, the counting means 195a counts the number of waves of the signal S. The counting means 195a compares the counted number of waves with a preset first reference value RV1 to detect the motion of the human body M. The counted number of waves is larger when the human body M has moved in the direction perpendicular to the wave front of the transmission wave (see FIG. 3) than when the human body M has moved in the direction parallel to the wave front of the transmission wave. In step S02, this can be used to detect the motion of the human body M by counting the number of waves of the signal S.

Here, in order to detect a human body M having the intention of using the toilet device 1 with higher accuracy, the first reference value RV1 is preferably set larger than the number of waves for the case where the human body M has moved outside the toilet room 3 in the direction parallel to the wave front of the transmission wave.

Alternatively, step S01 can be omitted in the sensing processing shown in FIG. 8. In this case, in step S02, the radio wave sensor 17 counts the number of waves of the Doppler frequency (approximately 160 Hz or less) generated by the average moving velocity of a human body and compares it with the first reference value RV1.

The counting means 195a counts the number of waves of the signal S by e.g. counting the number of peaks of the signal S. Alternatively, a reference intensity may be set in advance. The counting means 195a may count the number of waves by performing zero-cross detection for counting the number of times of crossing between the signal S and the reference intensity. When the number of waves counted by the counting means 195a within a prescribed time exceeds the first reference value RV1, the flow proceeds to step S03. When the counted number of waves is less than or equal to the first reference value RV1, the flow returns to step S01.

If the number of waves counted within the prescribed time is less than or equal to the first reference value RV1, the counted number of waves is reset when the prescribed time has elapsed. Alternatively, the counted number of waves may be reset when a preset time has elapsed since the counted number of waves stopped increasing.

In step S03, as in step S01, the signal intensity detection means 195b detects the intensity of the signal S. When the human body M passes through the door 23 and approaches the toilet seat device 5, the intensity of the signal S further increases. When the signal intensity detection means 195b detects that the intensity of the signal S has exceeded a first level L1 (that the human body M has entered the first sensing area A1), the flow proceeds to step S04. That is, step S03 detects the presence of a human body in the first sensing area A1.

In step S04, the determination section 17b determines that a human body M has been sensed.

In the sensing processing shown in FIG. 8, steps S01 and S02 may be performed concurrently with step S03. The sensing processing may be performed so as to proceed to step S04 when the conditions of all these steps have been satisfied.

Here, in the toilet device 1 according to this embodiment, it may not be determined that a human body has been sensed. Such an example is described with reference to FIGS. 9 to 12.

Figure 9:
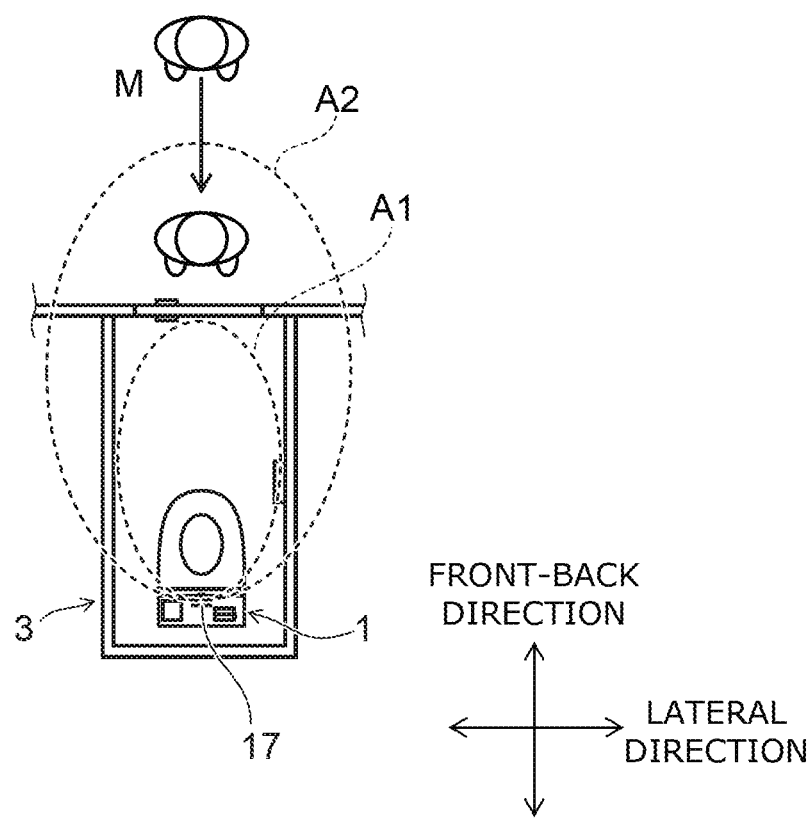
FIG. 9 is a plan view showing an alternative example of sensing areas and the movement of a human body.
Figure 11:
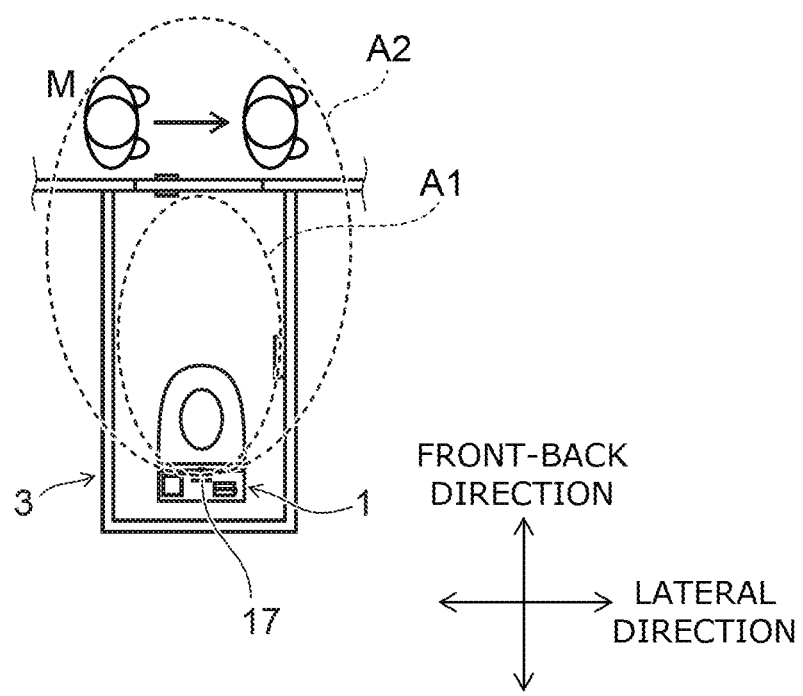
FIG. 11 is a plan view showing an alternative example of sensing areas and the movement of a human body.

FIGS. 9 and 11 are plan views showing alternative examples of sensing areas and the movement of a human body.

Figure 10:
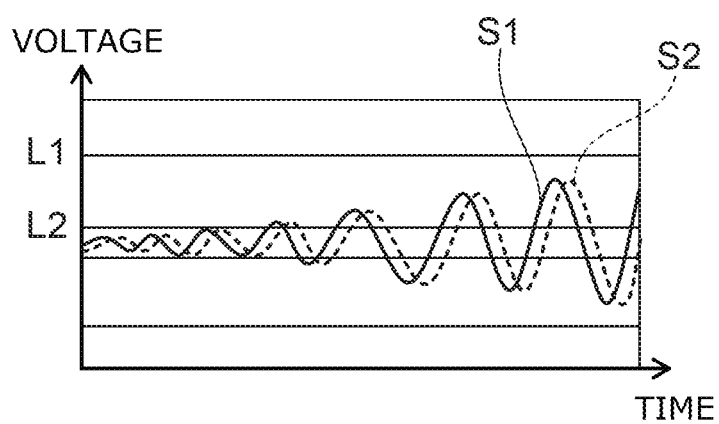
FIG. 10 is a graph showing the signal S generated by the reception output section in the example shown in FIG. 9.

FIG. 10 is a graph showing the signal S generated by the reception output section 191 in the example shown in FIG. 9.

Figure 12:
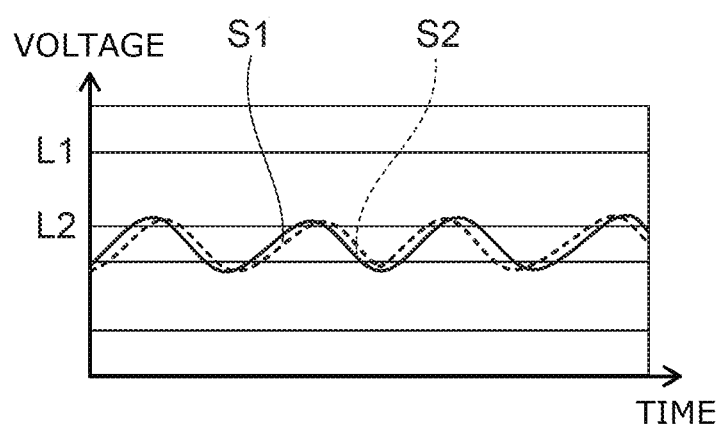
FIG. 12 is a graph showing the signal S generated by the reception output section in the example shown in FIG. 11.

FIG. 12 is a graph showing the signal S generated by the reception output section 191 in the example shown in FIG. 11.

In the example shown in FIGS. 9 and 10, a human body M approaches the toilet seat device 5, but does not enter the toilet room 3. In this case, the number of waves of the signal S counted in the second sensing area A2 may exceed the first reference value RV1. However, the human body M does not enter the first sensing area A1, and the intensity of the signal S does not exceed the first level L1. Thus, in the flow chart shown in FIG. 8, the condition of step S03 is not satisfied. Accordingly, the determination section 17b does not determine that a human body has been sensed.

In the example shown in FIGS. 11 and 12, a human body M enters the second sensing area A2. However, the human body M moves in the direction parallel to the wave front of the transmission wave (see FIG. 3). Thus, the counted number of waves does not exceed the first reference value RV1, and the condition of step S02 is not satisfied.

Alternatively, at this time, the first sensing area A1 may be expanded to the outside of the toilet room 3 due to the change of the state or the outside environment of the toilet device 1. Thus, the intensity of the signal S may exceed the first level L1. However, even in this case, the number of waves counted in the second sensing area A2 does not exceed the first reference value RV1. Thus, the determination section 17b does not determine that a human body M has been sensed.

In the example shown in FIG. 11, as shown in FIG. 12, the signal S2 lags behind the signal S1 during the first half until the human body M reaches right in front of the radio wave sensor 17.

On the other hand, the signal S1 lags behind the signal S2 during the second half after the human body M passes right in front of the radio wave sensor 17. This relationship between the signal S1 and the signal S2 may cause the moving direction discrimination means 195c to determine that the first half is "approaching" and the second half is "leaving". However, irrespective of the detection result of the moving direction discrimination means 195c, the counted number of waves does not exceed the first reference value RV1. Thus, the determination section 17b does not determine that a human body M has been sensed.

Here, for instance, in the conventional art, the range of the first sensing area A1 is equal to the range of the second sensing area A2. In this case, in the example shown in FIGS. 9 and 10, both the number of waves and the signal intensity satisfy the conditions. Thus, it is determined that a human body has been sensed in the toilet device. However, in the example shown in FIG. 9, the human body may change the moving direction in front of the door 23 and pass in front of the toilet room 3. Thus, the conventional art may erroneously sense a person having no intention of using the toilet device if the sensing area is expanded to the outside of the toilet room.

With regard to this point, in the conventional art, the sensing area may be set smaller in advance. However, this causes a problem of failing to detect a human body when the sensing area is made smaller due to the structure or the outside environment of the toilet device.

In contrast, as described in the above specific example, this embodiment detects the motion of a human body M (counts the number of waves) in the second sensing area A2, and further detects the presence of a human body M in the first sensing area A1. Thus, a human body having the intention of using the toilet device 1 can be sensed with higher accuracy. This reduces the possibility of unnecessarily opening the toilet lid 15 or heating the toilet seat 13. Thus, the power consumption can be reduced.

Figure 13:
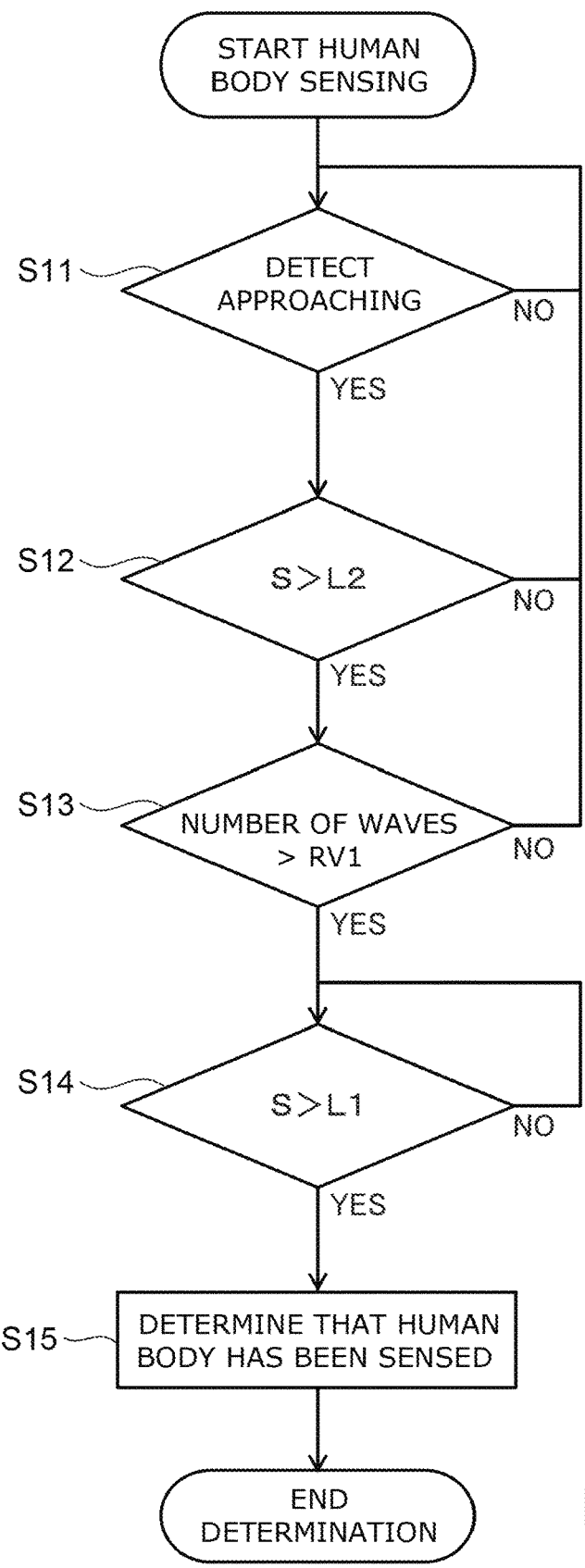
FIG. 13 is a flow chart showing an alternative processing of human body sensing in the toilet device according to the embodiment of the invention.

In the toilet device 1 according to this embodiment, the sensing processing represented by the flow chart shown in FIG. 13 may be performed instead of the sensing processing represented by the flow chart shown in FIG. 8.

FIG. 13 is a flow chart showing an alternative processing of human body sensing in the toilet device 1 according to the embodiment of the invention.

First, in step S11, the moving direction discrimination means 195c detects the moving direction of the human body M. Specifically, the moving direction discrimination means 195c detects whether the human body M approaches or leaves the toilet seat device 5 based on the phase difference between the signal S1 and the signal S2. For instance, when the human body M approaches the toilet seat device 5, as shown in FIG. 7, the signal S2 is detected later than the signal S1. When the human body M leaves the toilet seat device 5, on the contrary, the signal S1 is detected later than the signal S2. The moving direction discrimination means 195c uses this to detect approaching or leaving. When the moving direction discrimination means 195c determines that a human body M approaches the toilet room, the flow proceeds to step S12.

The subsequent steps S12-S15 are performed similarly to steps S01-S04 of the flow chart shown in FIG. 8.

That is, in step S12, the signal intensity detection means 195b compares the intensity of the signal S with the second level L2.

In step S13, the counting means 195a compares the number of waves of the signal S with the first reference value RV1.

In step S14, the signal intensity detection means 195b compares the intensity of the signal S with the first level L1.

In step S15, the determination section 17b determines that a human body has been sensed.

Step S12 can be omitted in the sensing processing shown in FIG. 13. In this case, when approaching is detected in step S11, comparison is made between the number of waves of the signal S and the first reference value RV1 in step S13.

In the flow chart shown in FIG. 13, the determination of step S11 may be performed concurrently with the determinations of steps S12 and S13. In this case, step S14 is performed when the conditions of steps S11-S13 are satisfied.

Alternatively, the determination of step S11, the determinations of steps S12 and S13, and the determination of step S14 may be performed concurrently. In this case, step S15 is performed when the conditions of steps S11-S14 are satisfied.

The detection of a human body M approaching or leaving the toilet seat device 5 is further performed in the second sensing area A2. Thus, a human body having the intention of using the toilet device 1 can be sensed with higher accuracy.

In particular, in the case of the sensing processing represented by the flow chart of FIG. 8, the conditions of steps S01-S03 may be satisfied when a human body leaves the toilet seat device 5. Thus, it may be determined that a human body has been sensed. Such an example is shown in FIGS. 14 and 15.

Figure 14:
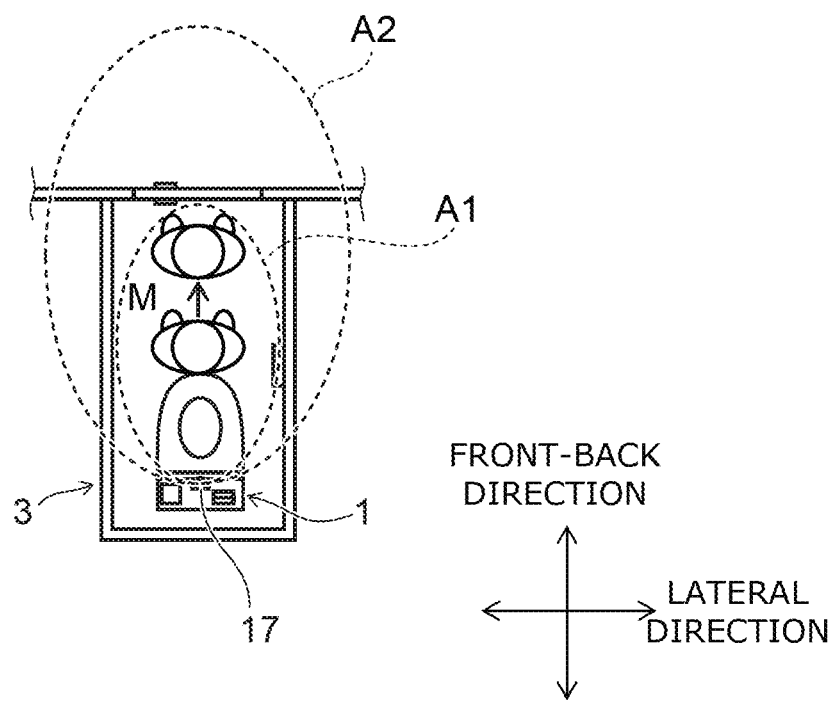
FIG. 14 is a plan view showing an alternative example of sensing areas and the movement of a human body.

FIG. 14 is a plan view showing an alternative example of sensing areas and the movement of a human body.

Figure 15:
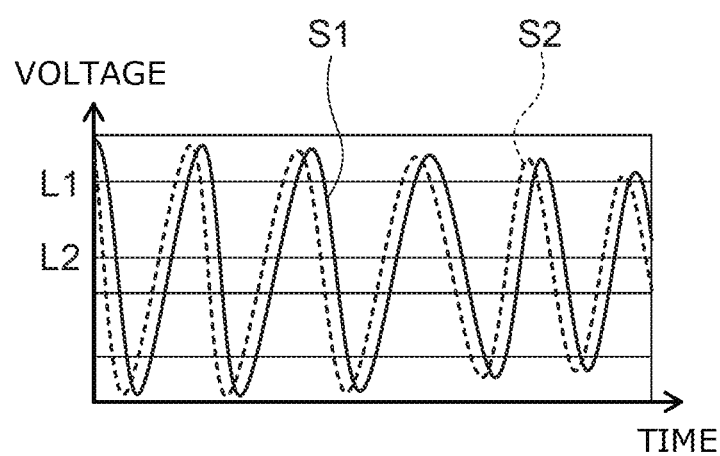
FIG. 15 is a graph showing the signal S generated by the reception output section in the example shown in FIG. 14.

FIG. 15 is a graph showing the signal S generated by the reception output section 191 in the example shown in FIG. 14.

As shown in FIG. 14, when a human body M leaves the toilet seat device 5, the human body M moves in the direction perpendicular to the wave front of the transmission wave. Thus, a larger number of waves are counted. Furthermore, the human body M is located in the first sensing area A1. Thus, the detected intensity of the signal S exceeds the first level L1 and the second level L2. Accordingly, in the case of the sensing processing represented by the flow chart of FIG. 8, it may be determined that a human body M has been sensed in the example shown in FIGS. 14 and 15.

In contrast, the sensing processing represented by the flow chart of FIG. 13 further detects approaching and leaving of a human body M. In the case of the motion of the human body M shown in FIG. 14, the signal S2 lags behind the signal S1 as shown in FIG. 15. Thus, the moving direction discrimination means 195c determines that a human body M leaves the toilet seat device. As a result, the determination section 17b does not determine that a human body has been sensed. This can reduce the possibility of erroneously sensing a human body having no intention of using the toilet device 1.

In the toilet device 1 in this embodiment, an alternative example of determining that a human body has been sensed is described with reference to FIGS. 16 to 17. This example may use either of the sensing processings represented by the flow charts shown in FIGS. 8 and 13.

Figure 16:
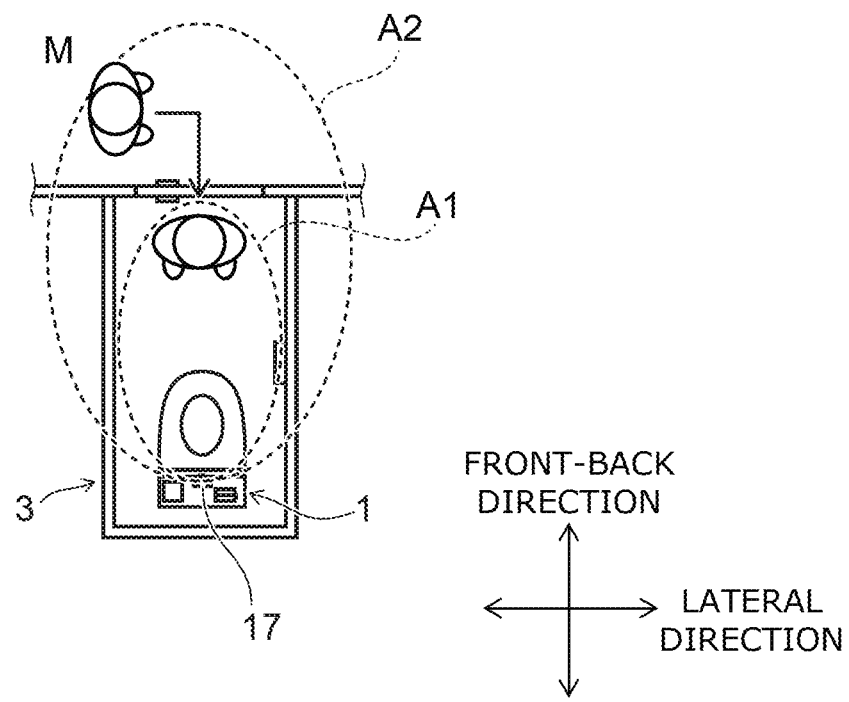
FIG. 16 is a plan view showing an alternative example of sensing areas and the movement of a human body.

FIG. 16 is a plan view showing an alternative example of sensing areas and the movement of a human body.

Figure 17:
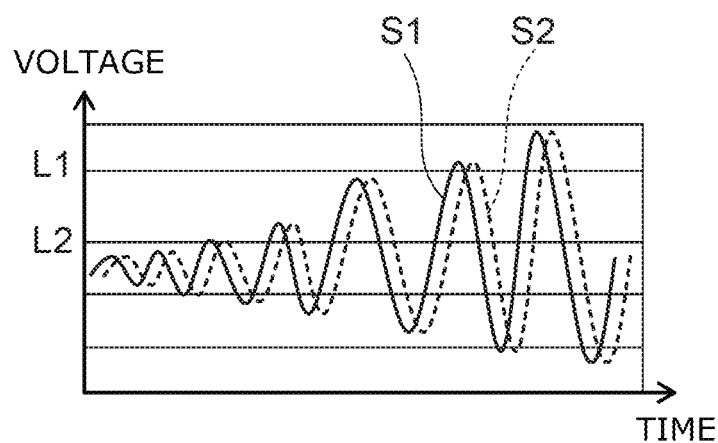
FIG. 17 is a graph showing the signal S generated by the reception output section in the example shown in FIG. 16.

FIG. 17 is a graph showing the signal S generated by the reception output section 191 in the example shown in FIG. 16.

In the example shown in FIG. 16, a human body M moves in the direction parallel to the wave front of the transmission wave (see FIG. 3) at the beginning. Then, the human body M rotates in front of the door 23 and enters the toilet room 3. In this case, the number of waves counted in the second sensing area A2 is smaller than in the example shown in FIG. 6. Thus, for instance, the number of waves exceeds the first reference value RV1 after the human body M enters the first sensing area A1. In this case, when the counted number of waves exceeds the first reference value RV1, the human body M has already been located in the first sensing area A1. Thus, the detected intensity of the signal S exceeds the first level L1. Accordingly, the determination section 17b determines that a human body M has been sensed.

As in the example shown in FIGS. 16 and 17, the counted number of waves may exceed the first reference value RV1 after the human body M enters the first sensing area A1. Thus, part of the second sensing area A2 preferably overlaps at least part of the first sensing area A1.

Figure 18:
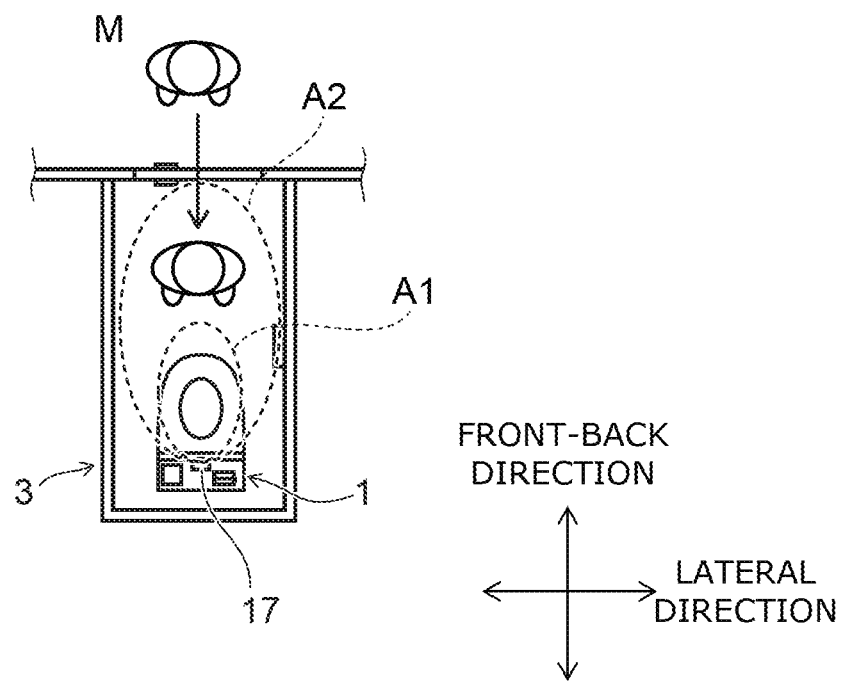
FIG. 18 is a plan view showing an alternative example of sensing areas and the movement of a human body.

FIG. 18 is a plan view showing an alternative example of sensing areas and the movement of a human body.

Figure 19:
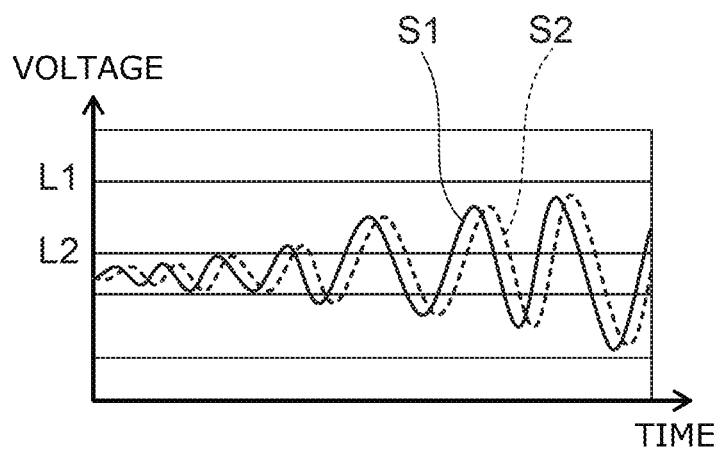
FIG. 19 is a graph showing the signal S generated by the reception output section in the example shown in FIG. 18.

FIG. 19 is a graph showing the signal S generated by the reception output section 191 in the example shown in FIG. 18.

The toilet device 1 may be used when the radio wave sensor 17 senses no human body M for some reason. The toilet device 1 of this embodiment may be configured so that the detection condition can be modified in such cases so as to be able to sense a human body M more reliably.

For instance, the intensity of radio waves emitted from the radio wave sensor 17 may decrease, or the intensity of radio waves reflected from the human body may decrease, depending on the temperature or humidity of the space installed with the toilet device 1, the objects placed around the toilet device 1, or the structure of the toilet device 1. The decrease of such intensity of radio waves makes it difficult for the intensity of the signal S to reach the first level L1 and the second level L2. This shrinks the second sensing area A2 and the first sensing area A1. As a result, as shown in FIG. 18, the range of the first sensing area A1 may shrink to the extent that a human body M cannot enter. In this case, in the sensing processing represented by the flow chart shown in FIGS. 8 and 13, the signal S does not reach the first level L1 or more. Thus, it is determined that a human body M has not been sensed.

In this case, for instance, even if the toilet lid 15 of the toilet device 1 is set to the automatic opening/closing mode, the toilet lid 15 is not automatically opened. Then, the toilet user ends up opening the toilet lid 15 by the remote controller 25 or his/her own hand. At this time, the determination section 17b memorizes that the toilet lid 15 has been opened without the signal S exceeding the first level L1 though the signal S exceeds the second level L2 and the number of waves exceeds the first reference value RV1. The opening/closing of the toilet lid 15 can be sensed by e.g. a sensor or switch, and the sensing signal can be outputted to the determination section 17b.

For instance, when such an event (the toilet lid 15 is opened without sensing a human body M) has occurred a prescribed number of times, the determination section 17b modifies the condition so that a human body M is more likely to be detected in the first sensing area A1. That is, the determination section 17b decreases the first level L1. By decreasing the first level L1, the first sensing area Al is expanded, and a human body M is made more likely to be detected.

Though the first level L1 is decreased, the toilet lid may be opened again without the signal S reaching the first level L1 or more. In this case, the determination section 17b may further decrease the first level L1.

In the case where the first level L1 cannot be further decreased, the determination section 17b can change the sensing processing so as to omit the step of comparing the signal S with the first level L1 by the signal intensity detection means 195b. That is, the determination section 17b can omit e.g. step S03 in the flow chart shown in FIG. 8. When the conditions of steps S01 and S02 are satisfied, the determination section 17b can proceed to step S04 and determine that a human body M has been sensed.

Alternatively, the toilet lid 15 may be opened without the signal S exceeding the first level L1 though the signal S exceeds the second level L2 and the number of waves exceeds the first reference value RV1. In this case, the determination section 17b may change the sensing processing so as to omit step S03 without decreasing the first level L1 at all.

Providing such a learning function can suppress the decrease of the accuracy of human body sensing even in the case where the first sensing area A1 and the second sensing area A2 are varied. In the above specific example, the detection condition of the human body M is modified provided that the toilet lid 15 is opened by a user not sensed by the radio wave sensor 17. However, this embodiment is not limited thereto.

Besides, for instance, the detection condition of the radio wave sensor 17 may be modified as described above based on the fact that e.g. the user not sensed by the radio wave sensor 17 is seated on the toilet seat 13 or flushes the toilet bowl 11 by the remote controller 25.

Figure 20:
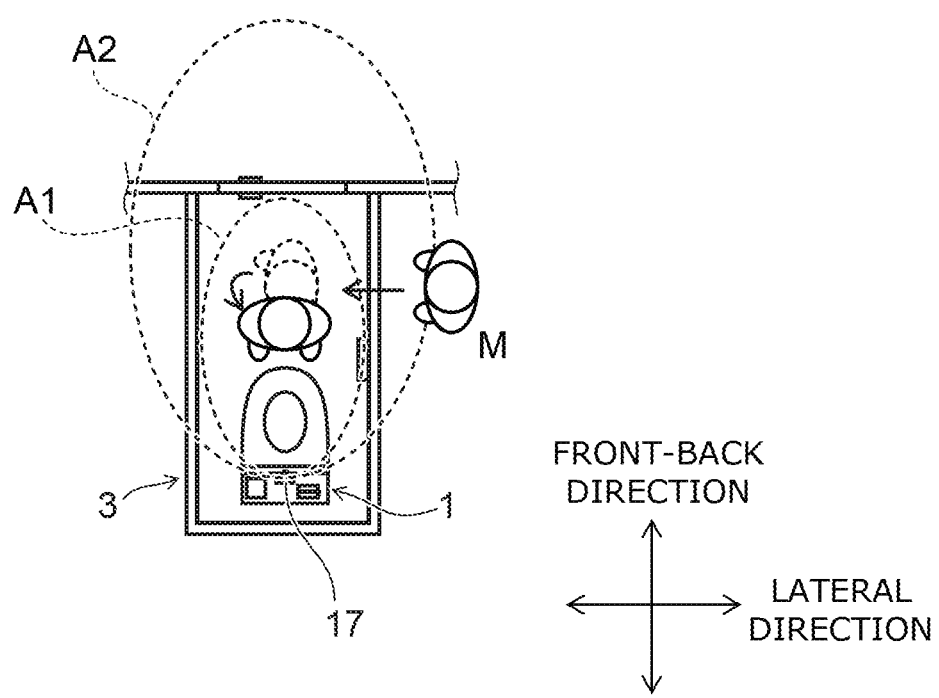
FIG. 20 is a plan view showing an alternative example of sensing areas and the movement of a human body.

FIG. 20 is a plan view showing an alternative example of sensing areas and the movement of a human body.

Figure 21:
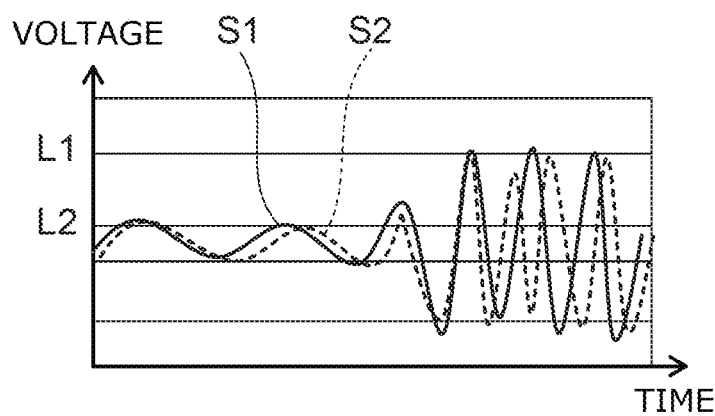
FIG. 21 is a graph showing the signal S generated by the reception output section in the example shown in FIG. 20.

FIG. 21 is a graph showing the signal S generated by the reception output section 191 in the example shown in FIG. 20.

The toilet room 3 as shown in FIGS. 1 and 2 has a structure in which the door 23 is provided in front of the toilet device 1. Besides, the toilet room 3 may have a structure in which the door 23 is provided on the lateral side of the toilet device 1. FIGS. 20 and 21 show an example in which the toilet device 1 according to this embodiment is installed in such a toilet room 3.

In the example shown in FIG. 20, the door 23 of the toilet room 3 is provided on the lateral side of the toilet device 1. In this case, the human body M enters the first sensing area A1 and the second sensing area A2 from the lateral side of the toilet device 1. As shown in FIG. 20, in the second sensing area A2, the human body M moves in a direction obliquely traversing the wave front of the transmission wave (see FIG. 3). Then, in the first sensing area A1, the human body M rotates so as to face or turn his/her back on the toilet device 1. Thus, as shown in FIG. 21, at the beginning, the intensity of the signal is low, and the number of waves is small. Then, the intensity of the signal and the number of waves increase.

By performing the sensing processing represented by the flow chart shown in FIG. 8, human body sensing can be performed with high accuracy also in the case where the door 23 is provided on the lateral side of the toilet device 1 as shown in FIG. 20.

On the other hand, in the case of the sensing processing represented by the flow chart of FIG. 13, the forward-backward relation of the phase between the signal S1 and the signal S2 may frequently change as shown in FIG. 21 due to the movement in a direction obliquely traversing the wave front of the transmission wave and the rotating motion. Thus, the condition of step S11 may not be satisfied, and it may be determined that a human body M has not been sensed.

In this case, the toilet lid 15 is opened while approaching of a human body M is not detected. For instance, when such an event has occurred a prescribed number of times, the determination section 17b can omit step S11. That is, the determination section 17b performs the sensing processing represented by the flow chart shown in FIG. 8 instead of the sensing processing represented by the flow chart shown in FIG. 13.

Providing such a learning function can suppress the decrease of the accuracy of human body sensing due to the mode of the toilet room 3 installed with the toilet device 1.

The above embodiment has been described with the toilet device taken as an example. However, the invention according to this embodiment is also applicable to human body sensing in other than the toilet device. For instance, this embodiment is also applicable to human body sensing in e.g. sanitary equipment such as a urinal, washbasin, toilet basin, and bath. Such sanitary equipment can be provided with the human body sensing device including the radio wave sensor and the controller described in the embodiment. This can reduce the possibility of erroneously detecting a person having no intention of using the equipment or facility.

The embodiments of the invention have been described above. However, the invention is not limited to the above description. Those skilled in the art can appropriately modify the design of the above embodiments. Such modifications are also encompassed within the scope of the invention as long as they include the features of the invention. For instance, the shape, dimension, material, and placement of each element of the toilet device 1 are not limited to those illustrated above, but can be appropriately modified.

Furthermore, the elements of the above embodiments can be combined with each other as long as technically feasible. Such combinations are also encompassed within the scope of the invention as long as they include the features of the invention.

What is claimed is:

1. A toilet device comprising:
    a toilet seat device provided on a toilet bowl;
    a radio wave sensor; and
    a controller configured to operate the toilet seat device based on a signal outputted from the radio wave sensor,
    the radio wave sensor being operable for:
    detecting presence of a human body in a first area including front of the toilet seat device,
    detecting motion of the human body in a second area including the front of the toilet seat device and a region outside the first area, and
    determining sensing of the human body based on detection result of the motion of the human body and detection result of the presence of the human body, and
    determining that the sensed human body has an intention of using the toilet seat device.

2. The device according to claim 1, wherein
    the radio wave sensor further detects the human body's approaching or leaving the toilet seat device in the second area, and
    the radio wave sensor determines sensing of the human body based on detection result of the human body's approaching or leaving the toilet seat device, the detection result of the motion of the human body, and the detection result of the presence of the human body.

3. The device according to claim 1, wherein
    the toilet seat device includes a toilet lid, and
    the controller opens the toilet lid when the radio wave sensor has determined that the human body has been sensed.

4. The device according to claim 1, wherein the radio wave sensor modifies condition of the detection in the first area so that a human body is more likely to be detected, when the toilet device has been used though it has not been determined that the human body has been sensed.

5. The device according to claim 1, wherein the radio wave sensor determines sensing of the human body based on the detection result in the second area irrespective of the detection result in the first area, when the toilet device has been used though it has not been determined that the human body has been sensed.

* * * * *

UNITED STATES PATENT AND TRADEMARK OFFICE
CERTIFICATE OF CORRECTION

PATENT NO. : 10,136,773 B2
APPLICATION NO. : 15/281552
DATED : November 27, 2018
INVENTOR(S) : Shoichi Tsuiki et al.

Page 1 of 1

It is certified that error appears in the above-identified patent and that said Letters Patent is hereby corrected as shown below:

In the Specification

Column 10, Line 4, "S11-514" should be -- S11-S14 --.

Signed and Sealed this
Nineteenth Day of March, 2019

Andrei Iancu
*Director of the United States Patent and Trademark Office*